Jan. 27, 1953          J. B. COLLINS          2,626,982
STATIC CONDUCTIVITY MEASURING DEVICE
Filed Nov. 12, 1949
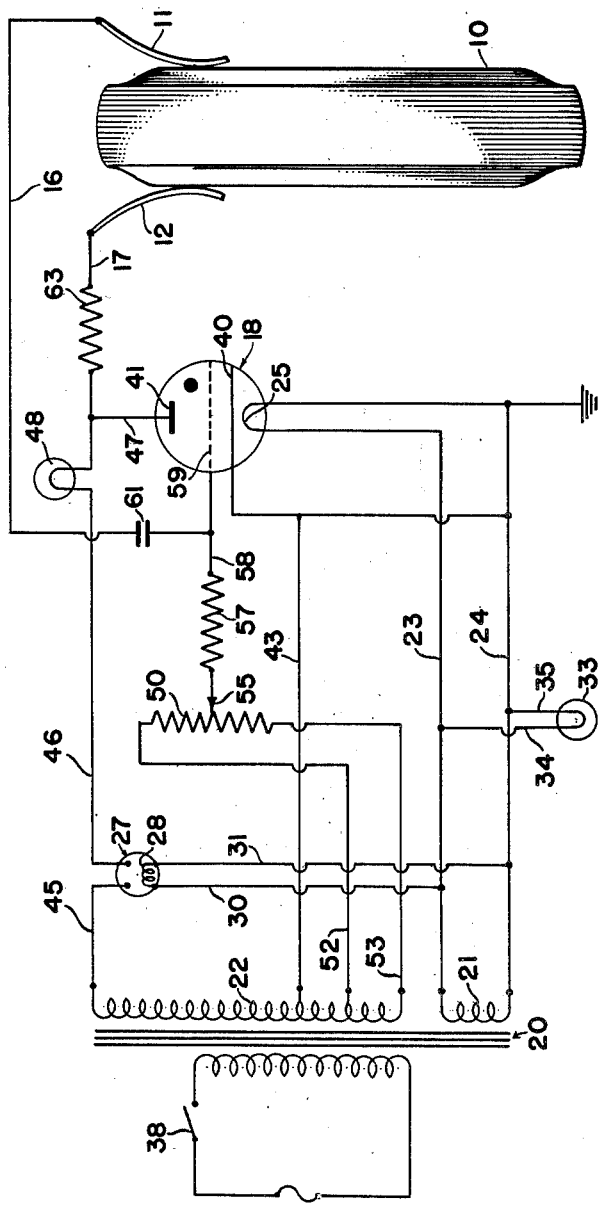
Inventor
JACK B. COLLINS
By Ely + Frye
Attorneys Patented Jan. 27, 1953

2,626,982

UNITED STATES PATENT OFFICE 2,626,982

STATIC CONDUCTIVITY MEASURING DEVICE

Jack B. Collins, Isleworth, England, assignor to The Firestone Tire & Rubber Company, Akron, Ohio, a corporation of Ohio Application November 12, 1949, Serial No. 126,774

4 Claims. (Cl. 175—183)

1

This invention relates to an improved method and apparatus for measuring the static conductivity of the side wall and tread stock of a pneumatic tire.

It is known in the art to provide both side wall and tread stock which have been compounded to permit dissipation, through electrical conduction, of static charges which would otherwise accumulate during rotation of the tire. Since the characteristics of compounded rubber vary, especially in respect to electrical conductivity, it is desirable periodically to spot-check the conductivity of tires upon completion of the manufacture thereof.

Heretofore various methods have been proposed for determining the conductivity of side wall and tread stock, but all such methods have been found either to be unreliable or to require an excessive amount of time and equipment. For example, the "Megger" resistance meter, available on the English market, must be operated by a person possessing the ability to read a logarithmic scale.

It is therefore a primary object of the present invention to provide an improved method for accurately and rapidly determining the static conductivity through a portion of a tire which includes both side wall and tread stock.

Another object of the invention resides in the provision of improved apparatus for carrying out the above method.

A still further object of the invention is to provide a simple but effective production instrument, manufacturable at relatively low cost and requiring minimum upkeep.

Another object of the invention relates to the provision of a measuring instrument of the type above described which is extremely simple in operation and which may be operated as a "go" and "no go" gauge by unskilled workmen with little or no previous instruction in the use thereof.

Other objects and advantages will become apparent to persons skilled in the art upon an examination of the drawing, specification, and the appended claims.

The drawing, in which like parts are identified by the same reference numerals, is a view, partially in plan and partially schematic, illustrating a preferred embodiment of the present invention.

Referring to the drawing, a tire 10, illustrated in plan, is disposed between a pair of contact springs 11 and 12 which may be disposed in any suitable manner to contact the tire at a point above the surface upon which the tire is supported, for example at approximately twenty inches above that surface. Springs 11 and 12 are distorted slightly by insertion therebetween of tire 10, thus insuring positive spring-biased engagement of contact springs 11 and 12 with the side wall surfaces of tire 10 to provide electrical contact therewith, tire 10 providing,

2 through its side wall and tread stock area, a high resistance load between contact springs 11 and 12.

Springs 11 and 12 are connected, by lead lines 16 and 17, to an electrical network including a triggering circuit operable through a thyratron tube 18. Tube 18, which may be of the conventional gas-filled grid triggered type, is connected in a conventional manner to a power transformer 20 of the multiple secondary type and including a low voltage filament heating section 21 and a relatively high voltage section 22 for the supply of required anode and grid potentials hereinafter described. Filament heating section 21 is connected, through lead lines 23 and 24, to the filament 25, of tube 18. A time-delay switch 27 includes an actuating coil 28 energized by low voltage section 21 and connected to lead lines 23 and 24 by lead lines 30 and 31. A pilot lamp 33 may also be connected by lines 34 and 35 to lead lines 23 and 24 respectively to indicate excitation of transformer 20 as controlled through primary switch 38.

The high potential secondary section 22 has a suitable portion thereof connected directly across cathode 40 and anode 41 of tube 18, cathode 40 being connected by means of lead line 43 and anode 41 being connected through time-delay switch 27; line 46 being series connected with line 47 which leads to anode 41, through a pilot lamp 48. The function of time-delay relay switch 27 is to break the circuit to anode 41 when transformer 20 is turned off and to allow a time delay period, when transformer 20 is turned on, of sufficient duration to allow filament 25 to heat cathode 40 to its operating temperature. The lower end of transformer section 22, as viewed in the drawing, is additionally tapped for the purpose of establishing voltage drop across a potentiometer resistance 50, connected to the lower portion of the tapped section through lead lines 52 and 53. The variable contactor 55 of potentiometer 50 is connected through a suitable dropping resistance 57 and lead line 58 to the control grid 59 of thyratron tube 18 to allow the grid potential to be varied in respect to the cathode. Line 16, connected to spring 11, is connected, through a condenser 61, to control grid 59. Line 17, connecting spring 12 to anode 41, may include a resistance 63.

Operation of the device is as follows. With transformer 20 excited, through the closing of primary switch 38, filament 25 heats cathode 40 of tube 18 and thereupon time delay switch 27 closes the circuit from transformer section 22 to anode 41. Pointer 55 of the potentiometer provides variation of grid potential in respect to the cathode 40 of tube 18. It will be noted that the grid potential is out of phase with the anode potential. Assuming that tire 10 is removed from between springs 11 and 12, during the half cycle in which the anode potential is positive, the grid 59 is of course negative, the potentiometer pointer 55 having been set to maintain the negative grid potential at a value beyond the cut-off point, and thyratron tube 18 does not fire. Assuming that tire 10, including side wall and tread portions of static conducting stock, is placed between springs 11 and 12, said stock provides a high resistance load therebetween, and since anode 41 is then connected, through condenser 61, acting as a phase inverter, to grid 59, the resulting potential, in phase with anode 41, brings the grid potential closer to the potential of cathode 40, allowing the tube to fire. Condenser 61 is required since tire 10, acting as a resistance capacity coupling, changes the phase of the potential applied to the grid, hence without inversion, the effect of connecting tire 10 in the circuit would be to drive grid 59 more negative instead of positive in respect to cathode 40.

The device, which acts as a "go" or "no go" resistance gauge, may be set to the desired degree of sensitivity by first a tire, by use of a resistance meter, which has maximum acceptable resistance, and using that tire in circuit and adjusting the potentiometer arm 55 to the point at which thyratron tube 18 starts firing. The apparatus may be put to other uses, such as production checking of lower resistances, by lowering the value of grid resistance 57, which may have a value of 2 megohms in the circuit described herein.

As tube 18 fires, i. e., becomes ionized and conducting, the anode potential, which may for example have been in excess of 200v., immediately drops to a low value due to the voltage drop across pilot lamp 48 which glows to indicate satisfactory conductivity through the section of tire 10 being tested. Due to ionization, tube 18 continues to remain conductive during the remainder of the half cycle during which anode 41 is positive. Upon return to the negative half cycle, the ionization within tube 18 is destroyed and the sequence is repeated.

Since the resistance offered by the tire section varies over quite wide limits, the value of resistor 63 will also vary, since the combined resistance of the tire and resistor 63 must be selected in a manner to insure the proper potential applied from anode 41 to grid 59 through those dropping resistances. To set the device up for any particular tire, a tire of known maximum resistance across its side wall and tread section is checked with a known type instrument such as a Megger to determine the value of the resistance through that section. Either the tire or a resistance of equal value is then connected between contactors 11 and 12 and potentiometer needle 55 adjusted to a grid value just above cut-off. No further adjustment is required, at least until such time as the characteristics of the thyratron tube might change during use. The tire may rapidly be positioned between the contactors 11 and 12 to be passed upon actuation of bulb 48 or rejected if the resistance thereof is too high to permit the grid 59 of thyratron tube 18 to be driven above cut-off value to fire the tube.

What is claimed is:

1. Apparatus for measuring the resistance of an article comprising a circuit including an electron discharge device connected to a source of alternating power and connected in series with an indicating means to indicate the flow of current through said device, an auxiliary circuit between the anode and the grid of said device for adjusting the grid potential thereof, said auxiliary circuit having in series a capacitor adapted to shift the phase of said grid potential with respect to the plate potential and contact means for gripping said article to introduce the resistance thereof into said auxiliary circuit.

2. In a device of the character described, an electrical circuit including a grid-actuated gas filled-electron discharge device means for heating the cathode thereof and means for the supply of alternating potential in out-of-phase relation to the anode and grid thereof, and an auxiliary electrical circuit having a resistance and a capacitance adapted to shift the phase of said grid potential with respect to the plate potential in series with contact means adapted to introduce a compounded rubber article into said auxiliary circuit.

3. In a device of the character described, an electrical circuit including a grid-actuated gas-filled electron discharge device connected to a source of alternating current for heating the cathode thereof and for the supply of alternating potential in out-of-phase relation to the anode and grid thereof, and an auxiliary electrical circuit having a fixed resistance and a capacitance adapted to shift the phase of said grid potential with respect to the plate potential in series with a pair of contacts adapted to grip a compounded rubber article between them to introduce the resistance thereof into said auxiliary circuit, potentiometer means for adjusting the grid potential of said discharge device to a value to bring said grid below cut-off when the resistance of said compounded article is below a pre-determined value, and signal means in series with the anode of said discharge device to indicate discharge thereof.

4. A "go" and "no go" instrument permitting a rapid check of the electrical resistance characteristics of an anti-static tire through a tread and side wall portion thereof, said device including an electronic circuit including a thyratron tube connected to a source of alternating current, indicating means connected in series with the anode of said tube, potentiometer means for initially adjusting the grid potential of said tube, and means for periodically bringing said grid potential below cut-off value comprising an auxiliary circuit connecting said grid and anode having a capacitor adapted to shift the phase of said grid potential with respect to the plate potential in series with contacting means adapted to receive therebetween a portion of said tire to introduce the electrical resistance thereof into said auxiliary circuit.

JACK B. COLLINS.

REFERENCES CITED

The following references are of record in the file of this patent:

UNITED STATES PATENTS

| Number | Name | Date |
| --- | --- | --- |
| 2,087,783 | Savage | July 20, 1937 |
| 2,220,489 | Lowkrantz | Nov. 5, 1940 |
| 2,272,239 | Delmhorst | Feb. 10, 1942 |
| 2,410,524 | Richardson et al. | Nov. 5, 1946 |